P. HUMBERT.
Chronometer Escapement.
No. 31,543.
Patented Feb. 26, 1861.
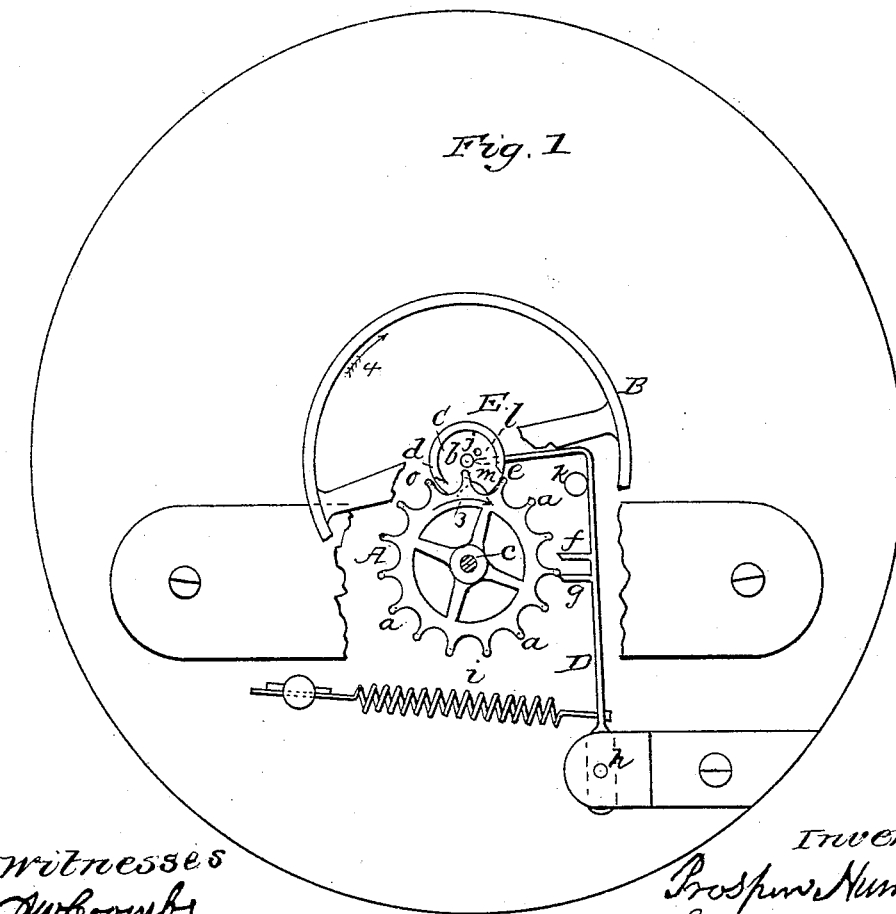

UNITED STATES PATENT OFFICE.

PROSPER HUMBERT, OF BOSTON, MASSACHUSETTS.

CHRONOMETER-ESCAPEMENT.

Specification of Letters Patent No. 31,543, dated February 26, 1861.

*To all whom it may concern:*

Be it known that I, PROSPER HUMBERT, of Boston, in the county of Suffolk and State of Massachusetts, have invented a new and useful Improvement in the Chronometer-Escapements for Watches and other Timekeepers; and I do hereby declare that the following is a full, clear, and exact description of the same, reference being had to the accompanying drawings, forming part of this specification, in which—

Figure 1 is a plan of an escapement constructed according to my invention. Fig. 2 is a side view of the same, partly in section.

Similar letters of reference indicate corresponding parts in both figures.

The escapement known as the "chronometer escapement," commonly used in chronometers and sometimes in watches, possesses the advantage over all other escapements in common use, in its leaving the balance independent of the 'scape wheel during a greater portion of its vibration the action of the 'scape wheel on the balance being continued through but a small fraction of its entire vibration, but in its application to watches it has the disadvantage of the balance receiving an impulse from the 'scape wheel only in one direction which renders the watch liable to stop temporarily if shaken suddenly at a certain stage of the operation of the escapement.

My invention consists in so applying a detent having two locking pallets to operate in combination with two impulse pallets on the cylinder attached to the balance that the balance receives a double impulse in each complete vibration, that is to say, one impulse in each direction from each tooth of the 'scape wheel, and that each tooth rests twice in each vibration of the balance back and forth, viz, once against each locking pallet.

To enable others skilled in the art to make and apply my invention I will proceed to describe it with reference to the drawings.

A. is the 'scape wheel having its teeth $a$, $a$, of cylindrical form, projecting from one side of the rim parallel with its axis and having its spindle $c$, parallel with the staff $b$, of the balance B. The hair spring which is omitted to prevent confusion of parts is to be applied to the balance in the usual manner.

C. is the cylinder secured on the staff of the balance very near to the plane of the revolution of the ends of the teeth of the 'scape wheel, and having secured to it the pallet arc E. which is concentric with the balance, and which has its ends so beveled as to form the two pallets $d$, and $e$.

D. is the detent arranged to vibrate in planes parallel with the plane of revolution of the 'scape wheel, and plane of oscillation of the balance, on a fixed spindle $h$; and $f$, $g$, are the locking pallets projecting from the detent. The said detent is drawn toward the spindle of the 'scape wheel and staff of the balance, by means of a spring $i$, but is prevented from approaching nearer to the said spindle and staff than is necessary to lock the teeth of the 'scape wheel, by a fixed stop $k$.

The extremity of the said detent is beveled on both sides, as shown at $l$, $m$, in Fig. 1, for the action upon it of the lifting pallet $j$, which is secured to the cylinder C.

The operation of the escapement may be best understood by reference to Fig. 1. The 'scape wheel rotates in the direction of the arrow 3, marked upon it. Each of its teeth in turn acts first upon the pallet $d$, to give the balance an impulse in the direction indicated by the arrow 4 shown near its rim in Fig. 1, and after it has done this is stopped by another tooth coming in contact with the locking pallet $f$, where it is held, while the balance completes its vibration, and until the latter has been returned by the reaction of the hair spring, to a position for a tooth that is within, and near the arc E, to come into action on the pallet $e$ when the detent is moved out of the way by the pin $j$, coming into operation on its bevel $m$, the 'scape wheel being now unlocked, the tooth in advance of that which just previously acted upon the pallet $d$, acts upon the pallet $e$, to give the impulse to the balance in the opposite direction to the arrow 4. This impulse having been given the tooth which was last stopped by the locking pallet $f$, falls against the locking pallet $g$, and the 'scape wheel remains locked while the vibration of the balance is completed and until the latter has been returned by the hair spring to a position for the pallet $d$, to be acted upon by another tooth of the 'scape wheel when the latter is unlocked by the pin $j$, coming into operation on the bevel $l$, of the detent, and moving the locking pallet $g$, out of the way of the 'scape wheel, and the balance receives a new impulse in the direction of the arrow 4. It will be understood that every tooth of the 'scape wheel is in turn locked during one vibration of the balance by the pallet $f$, and during the succeeding vibration by the pallet $g$; and every one in turn acts upon the pallet $e$, as well as upon the pallet $d$, but the tooth which acts upon $e$, is always the one in advance of that which has previously acted upon $d$.

The drawing represents the balance as being moved in the direction of the arrow 4, by the reactive effect of the hair spring and as being about to receive a new impulse in the same direction by the action of a tooth on the pallet $d$, the pin $j$, being about to come into action on the bevel $l$, of the detent to unlock the 'scape wheel from the pallet $g$. The balance may have a vibration in each direction equal to nearly two revolutions.

What I claim as my invention and desire to secure by Letters Patent is—

The combination with the two cylindro-pallets $d$, $e$, attached to the balance, of a detent D, with two locking pallets $f$, $g$, the whole arranged to operate substantially as herein described for the purpose of giving an impulse to the balance in each direction and locking each tooth of the 'scape wheel twice during each vibration of the balance back and forth.

PROSPER HUMBERT.

Witnesses:
 THEO. W. FARNSWORTH,
 ARTEMAS BROWN.